(12) United States Patent  (10) Patent No.: US 6,722,667 B2
Cantlon  (45) Date of Patent: Apr. 20, 2004

(54) WORKPIECE CONNECTOR FOR A POWER TOOL

(75) Inventor: Nathan Cantlon, Ronan, MT (US)

(73) Assignee: Jore Corporation, Pasco, WA (US)

( * ) Notice: Subject to any disclaimer, the term of this patent is extended or adjusted under 35 U.S.C. 154(b) by 0 days.

(21) Appl. No.: 09/877,717

(22) Filed: Jun. 8, 2001

(65) Prior Publication Data

US 2002/0020973 A1 Feb. 21, 2002

Related U.S. Application Data

(60) Provisional application No. 60/210,631, filed on Jun. 9, 2000.

(51) Int. Cl.[7] .................. B23B 31/107; B23B 31/22
(52) U.S. Cl. ............... 279/22; 279/30; 279/75; 279/155; 279/905; 81/438
(58) Field of Search ............. 279/30, 74, 75, 279/22, 29, 905, 906, 155; 81/438

(56) References Cited

U.S. PATENT DOCUMENTS 2,348,611 A * 5/1944 Davidson
2,751,229 A * 6/1956 Schultz
3,521,895 A * 7/1970 Smith
4,577,875 A   3/1986 Miyakawa
4,629,375 A * 12/1986 Lieser
4,692,073 A * 9/1987 Martindell
4,850,758 A * 7/1989 Morgan
5,013,194 A * 5/1991 Wienhold
5,062,749 A   11/1991 Sheets
5,398,946 A * 3/1995 Quiring
5,417,527 A * 5/1995 Wienhold
5,934,384 A * 8/1999 Wang
6,126,370 A * 10/2000 Wheeler
6,199,872 B1   3/2001 Hasan
6,270,085 B1   8/2001 Chen et al.
6,325,393 B1 * 12/2001 Chen
6,457,916 B2 * 10/2002 Wienhold

* cited by examiner

Primary Examiner—Sebastiano Passaniti
(74) Attorney, Agent, or Firm—Christensen O'Connor Johnson Kindness PLLC

(57) ABSTRACT

A connector (20) having an assembly (28) adapted to releasably receive an end (33) of a workpiece (22).

20 Claims, 6 Drawing Sheets

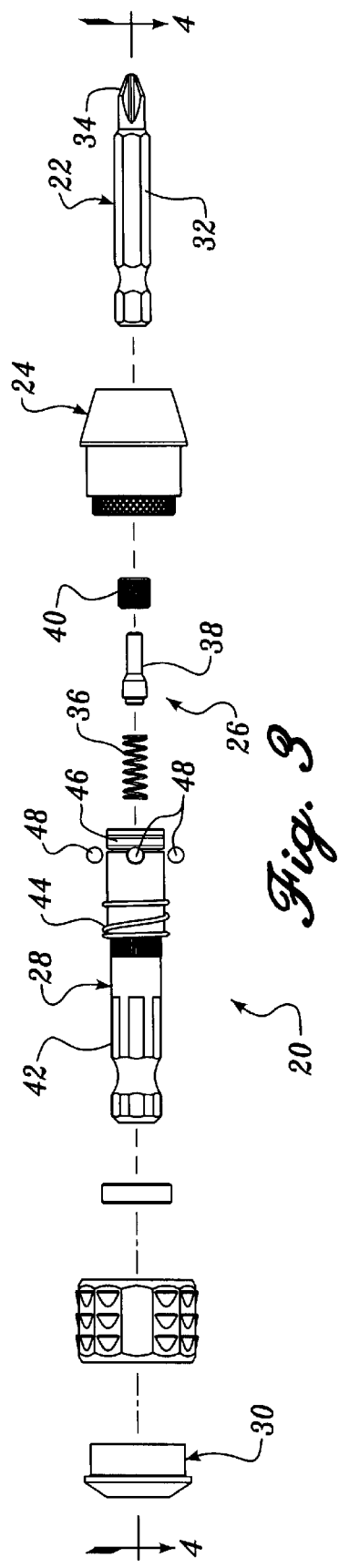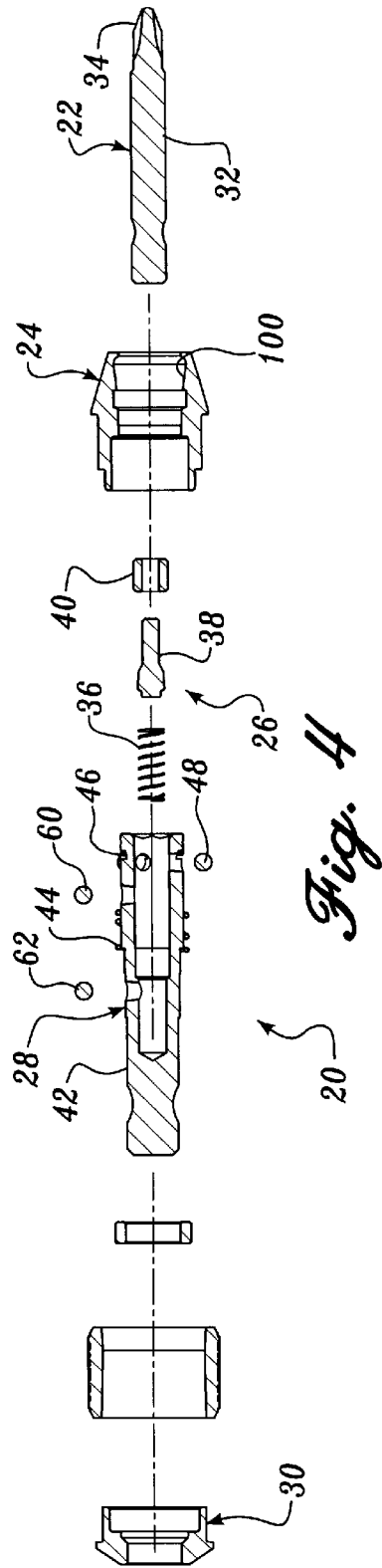

WORKPIECE CONNECTOR FOR A POWER TOOL

CROSS-REFERENCE(S) TO RELATED APPLICATION(S)

This application claims the benefit of U.S. Provisional Patent Application Ser. No. 60/210,631, filed Jun. 9, 2000, the disclosure of which is hereby expressly incorporated by reference.

FIELD OF THE INVENTION

The present invention relates generally to power tools and, more particularly, to a quick release connector for a handheld power tool.

BACKGROUND OF THE INVENTION

Typical handheld power tools, such as drills, include a chuck adapted to securely couple a cylindrical or hex shank of a workpiece, such as a drill bit. In the past, coupling the workpiece to the power tool was manually accomplished by inserting the workpiece into the chuck and using a chuck key to selectively lock the workpiece to the power tool. Developments in coupling the workpiece to the power tool have resulted in a locking mechanism that is actuatable between a locked and unlocked position with the use of a single hand. Such locking mechanisms lock the hex shank of the workpiece to one side of the connector opposite the locking mechanism in a pressing operation. Although such locking mechanisms are effective at coupling a workpiece to a power tool, they are not without their problems.

One such problem resulting from the existing locking mechanisms results from how the workpiece is locked to the power tool. In this regard, forcing the hex shank of the workpiece to one side of the connector's hex cavity tends to increase runout in the resulting hex shank/connector interface.

Another problem associated with existing locking mechanisms is that the spring mechanism in the connector keeps a substantially constant tension on the locking mechanism. This tension must be relieved to remove the hex shank from within the connector. As a result, simultaneously relieving the tension and removing the hex shank from the connector results in a connector that is difficult to operate with one hand.

Thus, there is a need for a connector for a power tool that is operable with one hand and reduces potential runout.

SUMMARY OF THE INVENTION

A connector formed in accordance with one embodiment of the present invention includes an assembly adapted to releasably receive an end of a workpiece.

BRIEF DESCRIPTION OF THE DRAWINGS

The foregoing aspects and many of the attendant advantages of this invention will become better understood by reference to the following detailed description, when taken in conjunction with the accompanying drawings, wherein:

FIG. 3 is a side exploded view of a connector for a power tool formed in accordance with one embodiment of the present invention;

FIG. 4 is a cross-sectional view of the connector of FIG. 3 taken substantially through Section A—A;

DETAILED DESCRIPTION OF THE PREFERRED EMBODIMENT

Figure 1:
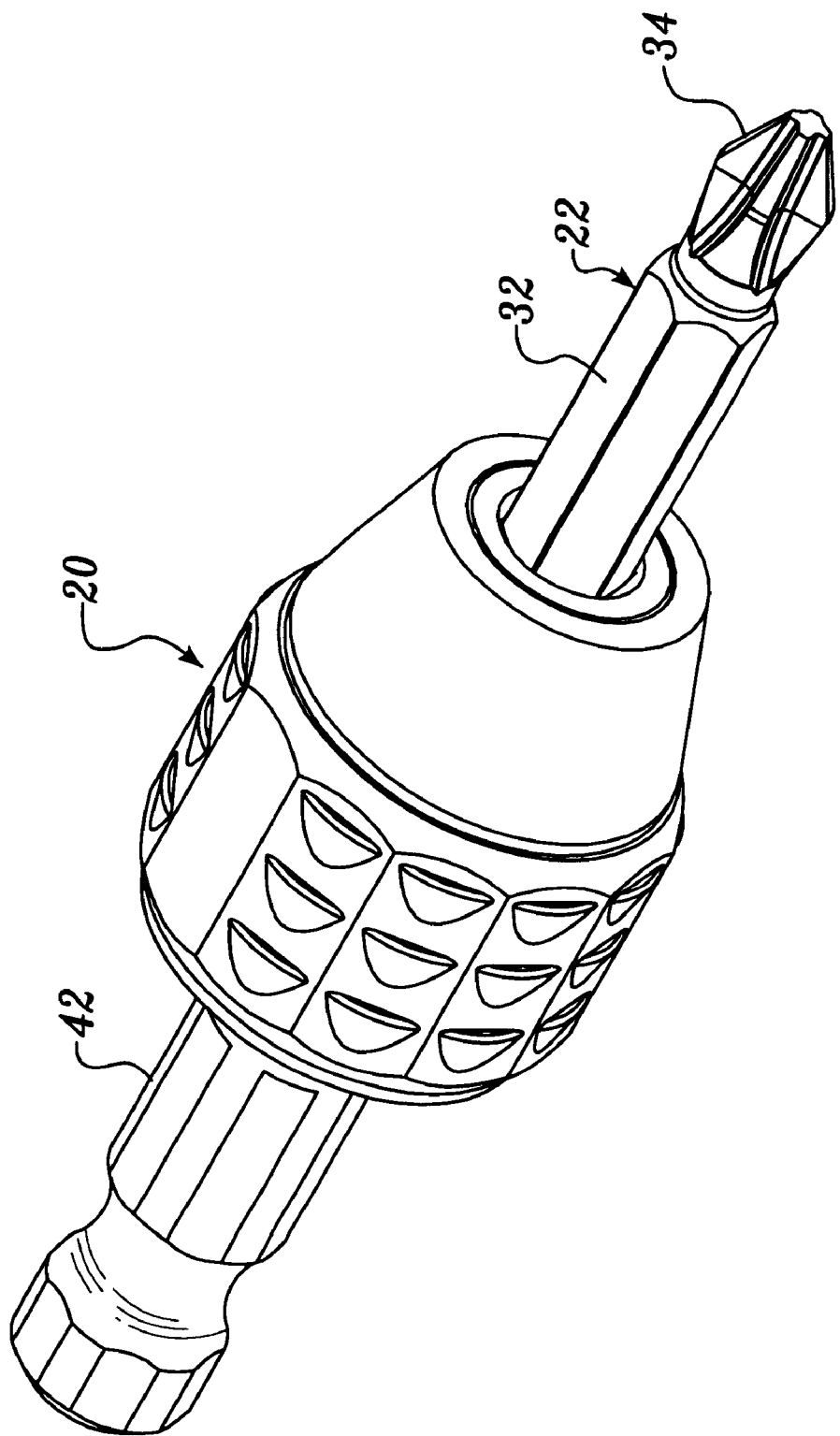
FIG. 1 is a perspective view of a connector for a power tool formed in accordance with one embodiment of the present invention.
Figure 2:
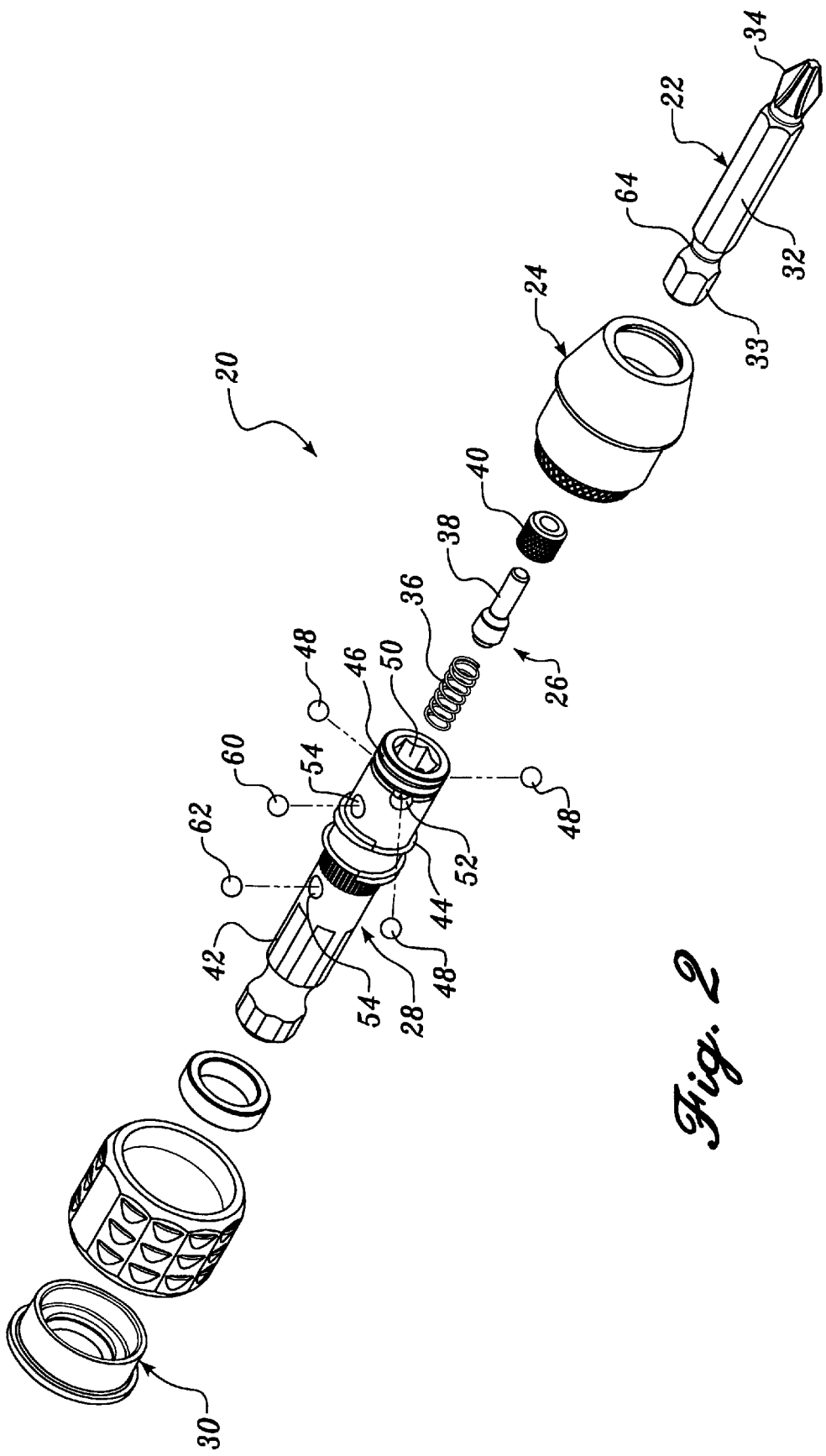
FIG. 2 is an exploded view of a connector for a power tool formed in accordance with one embodiment of the present invention.
Figure 8:
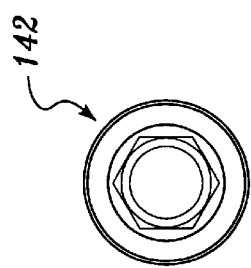
FIG. 8 is an end planar view of the alternate shaft of FIG. 6 taken substantially through Section 8—8.
Figure 5:
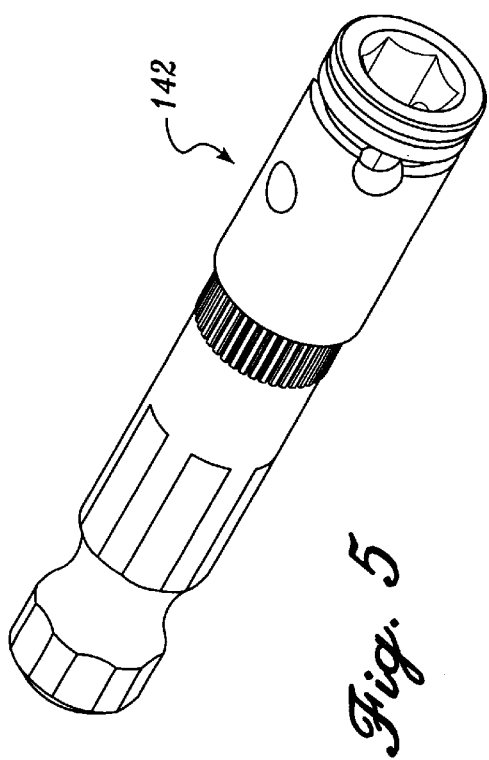
FIG. 5 is a perspective view of an alternate shaft for a connector formed in accordance with the present invention.
Figure 6:
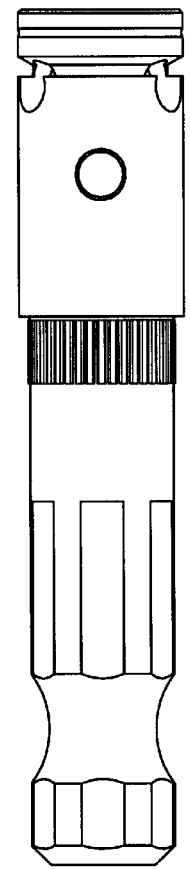
FIG. 6 is a side planar view of the alternate shaft of FIG. 5.
Figure 7:
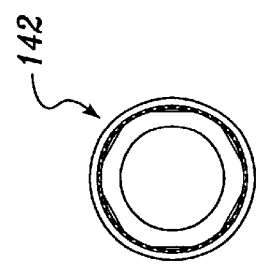
FIG. 7 is an end planar view of the alternate shaft of FIG. 6 taken substantially through Section 7—7.
Figure 9:
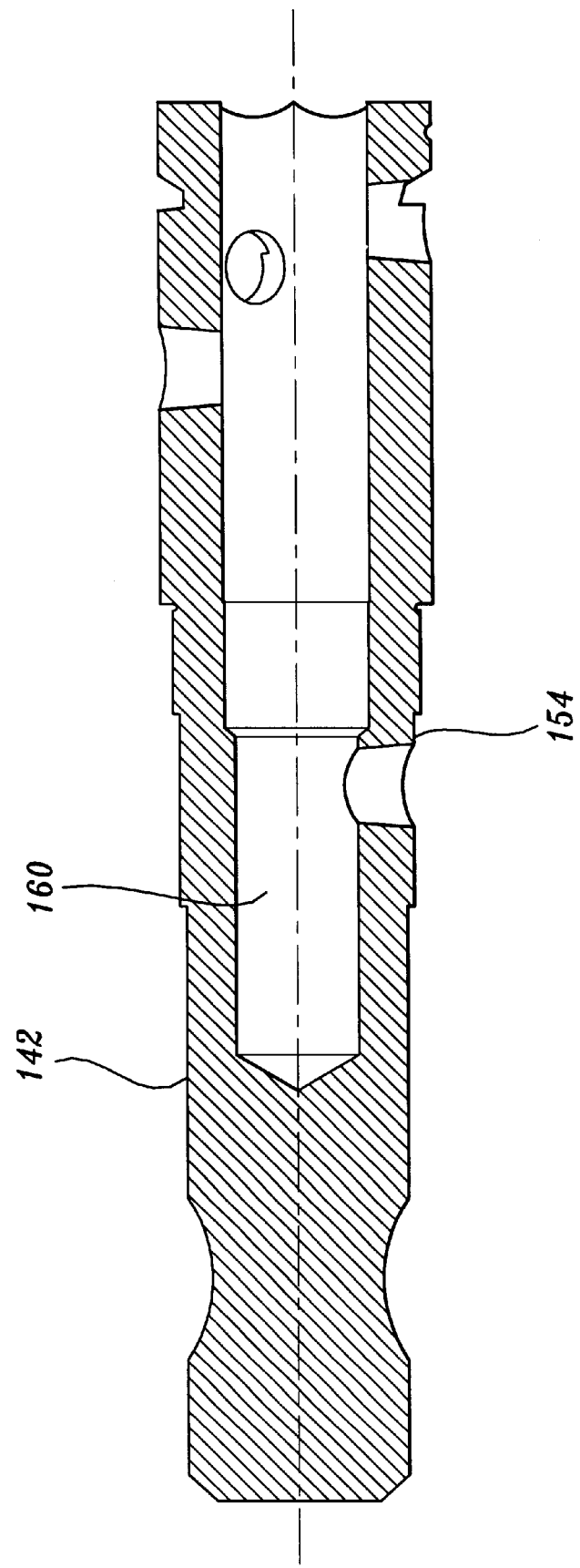
FIG. 9 is a cross-sectional side planar view of the alternate shaft of FIG. 6.

FIGS. 1–4 illustrate a connector 20 formed in accordance with one embodiment of the present invention. The connector 20 is adapted to selectively attach a workpiece 22 to a power tool (not shown). Although the workpiece 22 is illustrated as a Phillips head screwdriver, other workpieces, such as a standard screwdriver and a drill bit, are also within the scope of the present invention.

The connector 20 includes a first collar 24, a spring biased ball pin assembly 26, a shaft assembly 28, and a second collar 30. The workpiece 22 is suitably formed from a high strength material and includes a cylindrical drive portion of the hex stem 32 and an appropriate shaped head portion 34. The drive portion of the hex stem 32 is sized to be slidably received within the shaft assembly 28 and is seated therein on a spring biased ball pin assembly 26.

The spring biased ball pin assembly 26 includes a coil spring 36, a ball pin 38, and a plug 40. The spring biased ball pin assembly 26 is biased to selectively eject the workpiece 22 from within the connector 20, as is described in greater detail below.

The shaft assembly 28 includes a shaft 42, collar springs 44, a ball spring 46, and centering balls 48. One end of the shaft 42 is adapted to be received within a corresponding chuck of a well known power tool. The other end of the shaft 42 includes a cavity 50 adapted to lockingly receive the hex stem 32 of the workpiece 22. Three of the centering balls 48 are disposed around the shaft 42 and are received within corresponding tapered cavities 52. The centering balls 48 are restrained within the cavities 52 by the ball spring 46.

The shaft 42 also includes a pair of tapered cavities 54 aligned along a longitudinal axis extending between the open ends of the shaft 42, such that a forward ball 60 is located near the forward or open end of the shaft 42. A rearward ball 62 is located substantially near a midpoint defined along a longitudinal axis extending between the opened and closed ends of the shaft 42.

Figure 10:
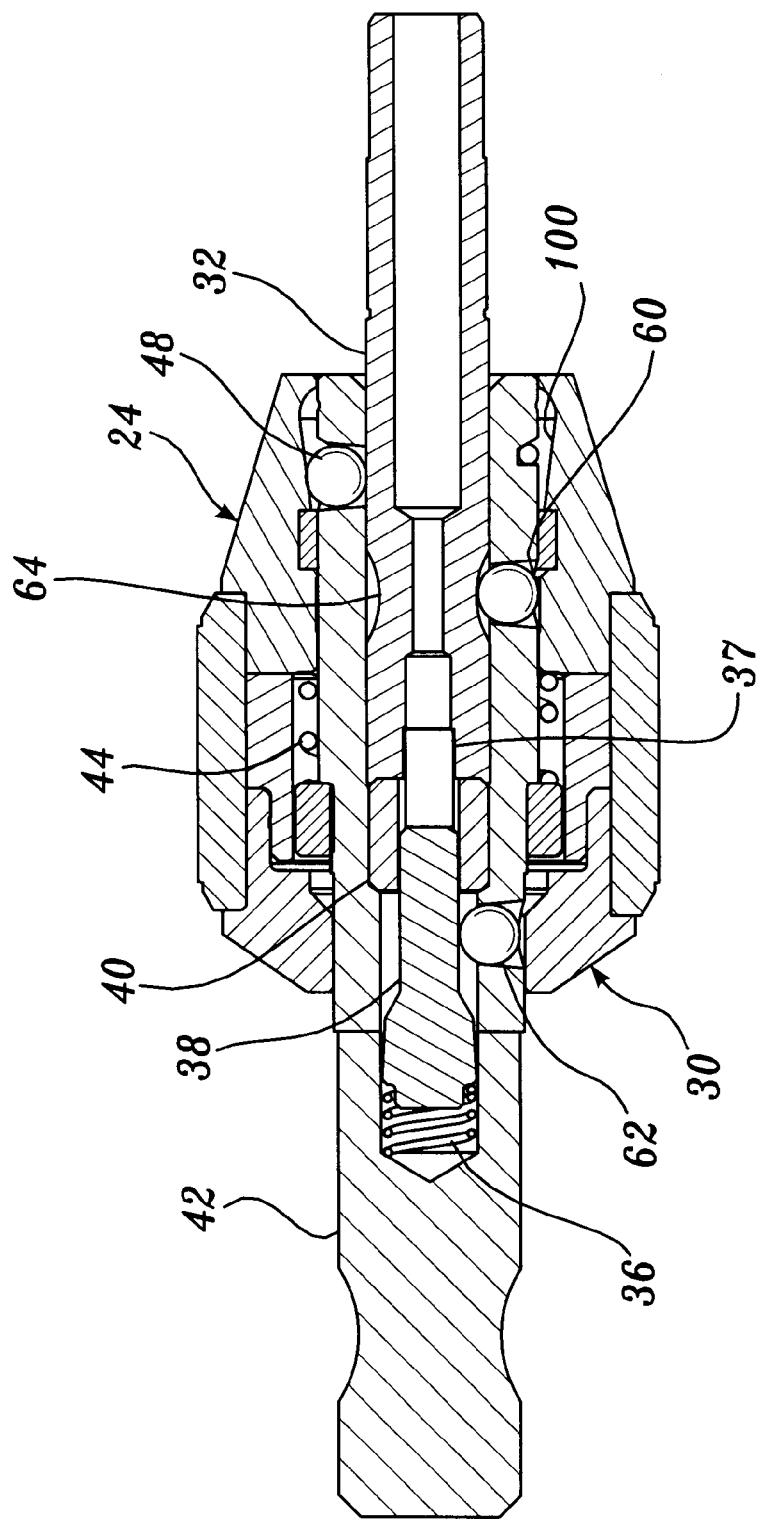
FIG. 10 is a cross-sectional side planar view of a connector formed in accordance with one embodiment of the present invention showing attachment of an optional workpiece attachment.

Still referring to FIGS. 1–4, operation of the connector 20 will now be described in greater detail. To selectively couple the workpiece 22 to the connector 20, the drive portion of the hex stem 32 of the shaft 42 is inserted into the connector 20, such that the three centering balls 48 near the front lift up and over a lower portion 33 of the hex stem 32 and drop into a power groove 64. Continued insertion of the shaft 42 causes the centering balls 48 lift up and over the power groove 64 and contact the drive portion of the hex stem 32. The lower portion of the hex stem 32 eventually contacts the ball pin 38 at the back of the shaft's cavity 50. The operator then continues to press the workpiece 22 into the connector 20. This operation causes the ball pin 38, which is tensioned forward by the pin spring 36 to react until the lower portion 33 of the hex stem 32 presses up against the plug 40. The plug 40 retains the ball pin 38 and allows clearance for a hex pin 37 found in other optional hex stem configurations, such as the hex pin found in a reversible drill and driver manufactured by Jore Corporation and seen in FIG. 10. The ball pin 38 retracts rearwardly to allow the rearward ball 62 to drop into its corresponding tapered hole 54 and flush to the diameter of the shaft 42. This, in turn, allows the first and second collars 24 and 30 to shift forward because it is tensioned towards the forward position.

In translating forward, the collar forces the forward ball 60 to drop into its tapered hole 54, thereby locking the hex stem 32 at the power groove 64. The collar continues forward to contact the three centering balls 48 located at the front of the connector 20. The internal taper 100 (FIG. 4) at the front portion of the first collar 24 forces the three centering balls 48 to contact the drive portion of the hex stem 32 and lock it into a centered position. This locking and centering operation takes place by the user simply inserting the workpiece 22 into the connector 20.

To remove the workpiece 22, the order of operations is basically reversed. The operator pulls the collar back. With this operation, the tension is removed from the centering balls 48 and the ball locking mechanism, comprised of the forward ball 60 and the forward tapered hole 54. At the end of its travel, the collar allows space for the rearward ball 62 to move back up out of its hole 54 in the shaft 42. The coil spring 36, inside the connector 20, forces the ball pin 38 forward. This in turn forces the rearward ball 62 up and secures the collar in place. The ball pin 38 then moves forward, thus moving the workpiece 22 to a position where the three centering balls 48, which are tensioned radially inward by the ball spring 46, move off of the drive portion of the hex stem 32 and drop back into the power groove 64. The three tensioned balls 48 hold the workpiece 22 at the power groove 64 with a light grip until the operator selectively removes the workpiece 22 from the connector 20.

Referring now to FIGS. 5–9, an alternate shaft 142 formed in accordance with the present invention will now be described in further detail. The shaft 142 of the alternate embodiment is identical in materials and operation as the shaft 42 described above with the following exception. As best seen by referring to FIG. 9, the aft hole 154 has been relocated to a position 180 degrees (based on a longitudinal axis running down the center of the shaft 142) from its position shown in the shaft 42 of the first embodiment of FIGS. 1–4. With the ball location change of this alternate embodiment, all of the ball holes are oriented symmetrically around the shaft's center axis 160. All other connector components are also symmetric about the axis 160 when in the assembled position.

The radial balance of this alternate embodiment helps to minimize centripetal (centrifugal) forces when the connector is rotating in a power drill. Minimizing the forces that result from rotation results in less vibration. This in turn helps utilize the minimized runout capabilities of the connector. Less runout from the hex stem component (drill, nut driver, power bit, etc.) results in easier use, and greater accuracy from the user's standpoint. For the purposes of this invention, radial balance is defined as the center of mass for the assembly as it is aligned with the axis of rotation for the assembly.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A workpiece connector for a handtool, the workpiece connector comprising:
   (a) a shaft having a longitudinally extending channel, the channel sized to selectively receive a stem portion of a workpiece;
   (b) a first collar slidably received on the shaft;
   (c) a locking assembly extending between the shaft and the first collar, the locking assembly positioned to be selectively displaced into locking engagement with a groove formed on the workpiece;
   (d) a centering assembly extending between the first collar and the shaft, the centering assembly simultaneously centering the workpiece within the shaft as the locking assembly is selectively displaced into locking engagement with the workpiece; and
   (e) a biased pin assembly disposed within the channel of the shaft, the biased pin assembly being biased to selectively eject the workpiece from within the channel when the locking assembly is displaced into an unlocked position, wherein the biased pin assembly includes a ball pin slidably disposed within the channel of the shaft on a spring and a plug having a first side in contact with the ball pin and a second side abutting one end of the workpiece when the workpiece is received within the channel.

2. The workpiece connector of claim 1, wherein the locking assembly comprises at least one ball reciprocally received within a cavity formed in the shaft, the ball being positioned for selective locking engagement with the groove of the workpiece.

3. The workpiece connector of claim 2, further comprising a biased pin assembly disposed within the channel of the shaft, the biased pin assembly being biased to selectively eject the workpiece from within the channel when the locking assembly is displaced into an unlocked position.

4. The workpiece connector of claim 3, wherein the biased pin assembly includes a ball pin slidably disposed within the channel of the shaft on a spring and a plug having a first side in contact with the ball pin and a second side abutting one end of the workpiece when the workpiece is received within the channel.

5. The workpiece connector of claim 4, wherein the centering assembly includes a plurality of balls reciprocally disposed within a correspondingly number of cavities formed with the shaft, the plurality of balls being in communication with the stem portion of the workpiece when the workpiece is received within the channel to center the workpiece within the channel.

6. The workpiece connector of claim 5, wherein the plurality of balls are symmetrically orientated about an axis extending longitudinally through the shaft.

7. The workpiece connector of claim 4, wherein the centering assembly includes at least one ball reciprocally mounted within a cavity formed with the shaft and in communication with the channel to engage the stem portion of the workpiece when the workpiece is received within the channel.

8. The workpiece connector of claim 7, further comprising a second collar slidably received on the shaft and coupled to the first collar for coordinated movement with the first collar during operation of the workpiece connector.

9. The workpiece connector of claim 1, wherein the locking assembly is automatically reciprocated between a locked position by inserting the workpiece within the channel and an unlocked position.

10. The workpiece connector of claim 9, wherein the locking assembly cooperates with sliding motion of the first collar to automatically reciprocate the locking assembly between the locked and unlocked positions.

11. The workpiece connector of claim 10, further comprising a biased pin assembly disposed within the channel of the shaft, the biased pin assembly being biased to selectively eject the workpiece from within the channel when the locking assembly is displaced into the unlocked position.

12. The workpiece connector of claim 1, wherein the centering assembly includes at least one ball reciprocally mounted within a cavity formed with the shaft and in communication with the channel to engage the stem portion of the workpiece when the workpiece is received within the channel.

13. The workpiece connector of claim 1, wherein the centering assembly includes a plurality of balls, each one of the plurality of balls reciprocally disposed within a correspondingly number of cavities formed with the shaft, the plurality of balls being in communication with the stem portion of the workpiece when the workpiece is received within the channel to center the workpiece within the channel.

14. The workpiece connector of claim 1, further comprising a second collar slidably received on the shaft and coupled to the first collar for coordinated movement with the first collar during operation of the workpiece connector.

15. A workpiece connector for a handtool, the workpiece connector comprising:

(a) a shaft having a longitudinally extending channel, the channel sized to selectively receive a stem portion of a workpiece;

(b) a first collar slidably received on the shaft;

(c) a locking assembly extending between the shaft and the first collar, the locking assembly positioned to be selectively displaced into locking engagement with a groove formed on the workpiece;

(d) a centering assembly extending between the first collar and the shaft, the centering assembly simultaneously centering the workpiece within the shaft as the locking assembly is selectively displaced into locking engagement with the workpiece; and (e) a second collar slidably received on the shaft and coupled to the first collar for coordinated movement with the first collar during operation of the workpiece connector.

16. A workpiece connector for a handtool, the workpiece connector comprising:

(a) a shaft having a longitudinally extending channel, the channel sized to selectively receive a stem portion of a workpiece;

(b) a first collar slidably received on the shaft;

(c) a locking assembly extending between the shaft and the first collar, the locking assembly positioned to be selectively displaced into locking engagement with a groove formed on the workpiece, wherein the locking assembly comprises at least one ball reciprocally received within a cavity formed in the shaft, the ball being positioned for selective locking engagement with the groove of the workpiece;

(d) a centering assembly extending between the first collar and the shaft, the centering assembly simultaneously centering the workpiece within the shaft as the locking assembly is selectively displaced into locking engagement with the workpiece; and (e) a biased pin assembly disposed within the channel of the shaft, the biased pin assembly being biased to selectively eject the workpiece from within the channel when the locking assembly is displaced into an unlocked position, wherein the biased pin assembly includes a ball pin slidably disposed within the channel of the shaft on a spring and a plug having a first side in contact with the ball pin and a second side abutting one end of the workpiece when the workpiece is received within the channel.

17. The workpiece connector of claim 14, wherein the centering assembly includes a plurality of balls reciprocally disposed within a correspondingly number of cavities formed with the shaft, the plurality of balls being in communication with the stem portion of the workpiece when the workpiece is received within the channel to center the workpiece within the channel.

18. The workpiece connector of claim 17, wherein the plurality of balls are symmetrically orientated about an axis extending longitudinally through the shaft.

19. The workpiece connector of claim 16, wherein the centering assembly includes at least one ball reciprocally mounted within a cavity formed with the shaft and in communication with the channel to engage the stem portion of the workpiece when the workpiece is received within the channel.

20. The workpiece connector of claim 19, further comprising a second collar slidably received on the shaft and coupled to the first collar for coordinated movement with the first collar during operation of the workpiece connector.

\* \* \* \* \*

UNITED STATES PATENT AND TRADEMARK OFFICE
CERTIFICATE OF CORRECTION

| | | |
|---|---|---|
| PATENT NO. | : 6,722,667 B2 | Page 1 of 1 |
| APPLICATION NO. | : 09/877717 | |
| DATED | : April 20, 2004 | |
| INVENTOR(S) | : N. Cantlon | |

It is certified that error appears in the above-identified patent and that said Letters Patent is hereby corrected as shown below:

| COLUMN | LINE | |
|---|---|---|
| 6 | 30 | "claim 14," should read --claim 16,-- |
| (Claim 17, | line 1) | |

Signed and Sealed this
Twentieth Day of September, 2011

David J. Kappos
*Director of the United States Patent and Trademark Office*